Oct. 20, 1942.                L. H. CHRISTENSEN                2,299,525
                        CROSS BAR SWITCHING APPARATUS
                           Filed Oct. 7, 1939              2 Sheets-Sheet 1
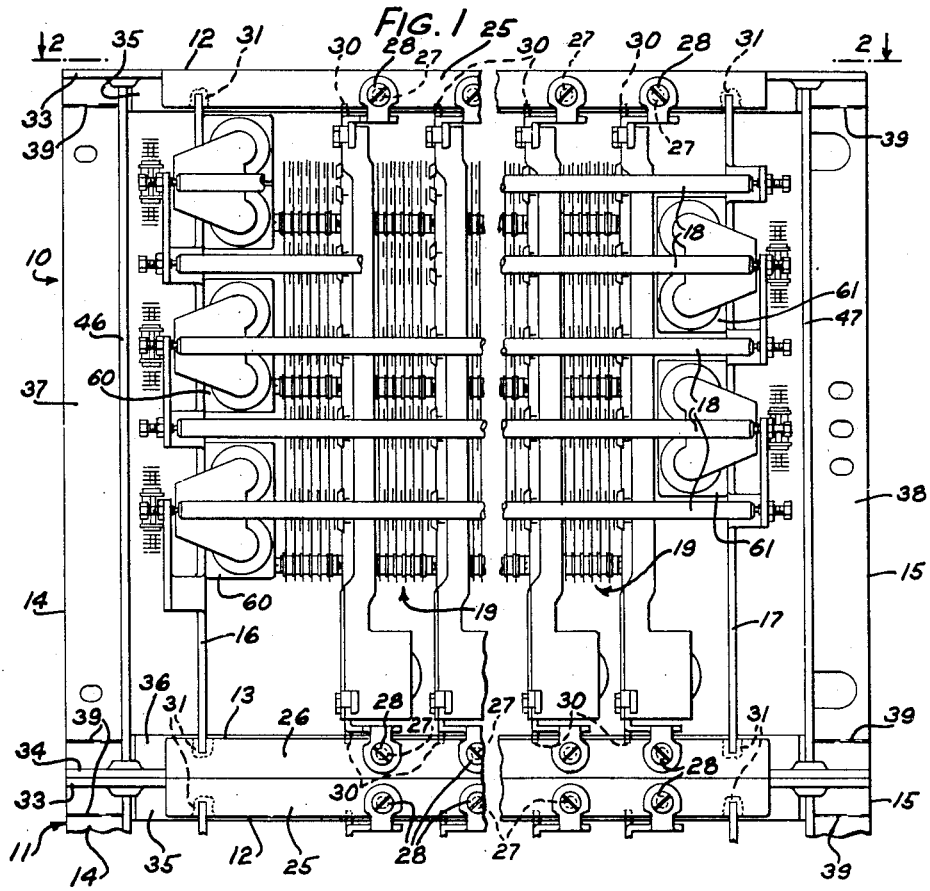
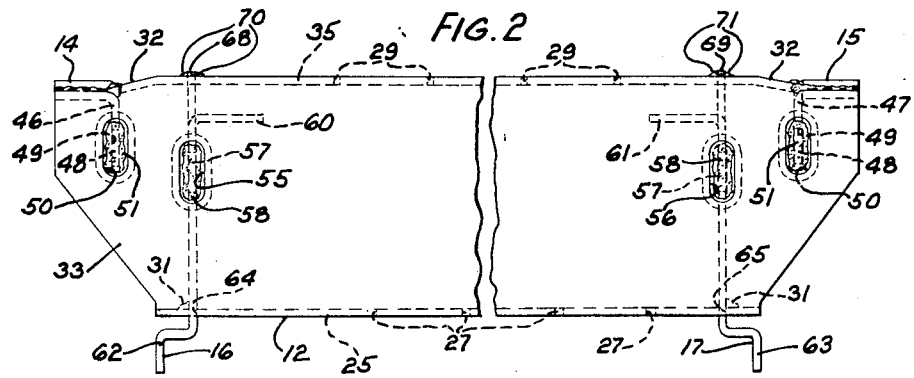
INVENTOR
L. H. CHRISTENSEN
BY Emery Robinson
ATTORNEY Oct. 20, 1942.    L. H. CHRISTENSEN    2,299,525
CROSS BAR SWITCHING APPARATUS
Filed Oct. 7, 1939    2 Sheets-Sheet 2
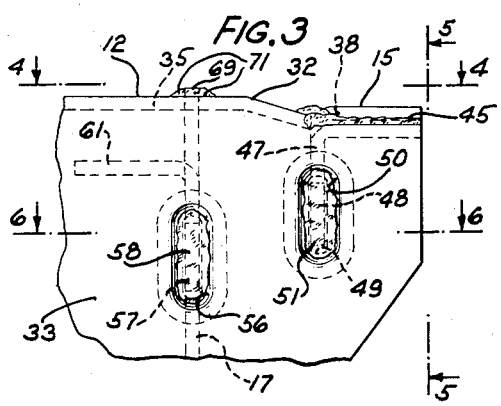
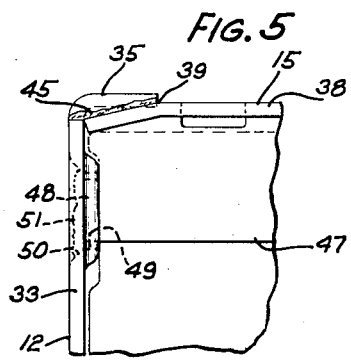
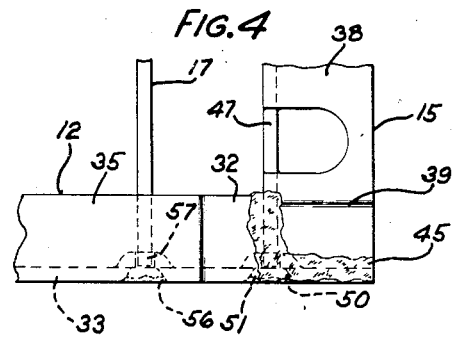
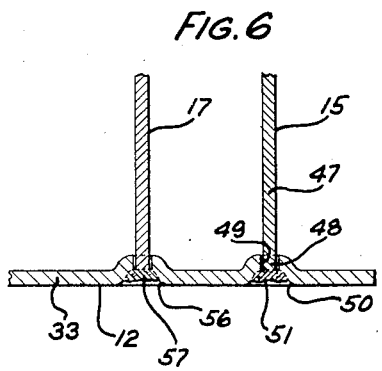
INVENTOR
L. H. CHRISTENSEN
BY Emery Robinson
ATTORNEY Patented Oct. 20, 1942

2,299,525

UNITED STATES PATENT OFFICE 2,299,525

CROSSBAR SWITCHING APPARATUS

Louis H. Christensen, Cicero, Ill., assignor to Western Electric Company, Incorporated, New York, N. Y., a corporation of New York Application October 7, 1939, Serial No. 298,382

7 Claims. (Cl. 179—27.54)

This invention relates to cross bar switching apparatus and more particularly to a supporting frame for telephone switching mechanisms of the cross bar type.

Cross bar switching apparatus of the type illustrated in the patents to J. N. Reynolds, Nos. 1,139,722 of May 18, 1915, 2,021,329 of November 19, 1935, and 2,040,334 of May 12, 1936 are adapted for mounting on large frameworks wherein a group of units such as those shown in the cited patents, are mounted closely adjacent one another. In the course of manufacturing such apparatus, the frameworks are made in relatively large quantities and the switching mechanisms are made in larger quantities since a great number of switching mechanisms will be mounted in each frame. It, therefore, becomes critical to hold the supporting frames for each switching unit within rather close dimensions to facilitate the manufacturing processes, which include mounting the small switching supporting frames on their respective frameworks.

An object of the present invention is to provide a supporting frame for telephone switch mechanisms which may be economically manufactured and the outer dimensions of which may be held within close limits without necessitating expensive machining operations.

In accordance with one embodiment of the invention, a supporting frame for a cross bar switching unit is made of a pair of main supporting plates substantially in the form of open channel members, one of the flanges of the channels being bent out of normal alignment at its ends to receive a supporting cross member and the web between the flanges at each end having one or more depressions formed therein which are slotted to receive extending ends of cross braces and mounting or bearing plates whereby the cross braces may be welded to the main members by depositing welding metal in the depressions without the necessity of grinding and buffing normally required when manufacturing such apparatus by welding methods.

A better understanding of the invention will be had by reference to the accompanying drawings, wherein Fig. 1 shows a cross bar switch unit mounted in its framework and a portion of a second unit mounted directly below it, part of the figure being broken away to conserve space;

Fig. 2 is a plan view of the supporting frame of the apparatus shown in Fig. 1 looking down at the top shown in Fig. 1 in the direction indicated by the arrows along line 2—2;

Fig. 3 is an enlarged fragmentary detail view of a part of the apparatus shown in Fig. 2, there being illustrated in Fig. 3 the upper right hand corner of the apparatus shown on a smaller scale in Fig. 2;

Fig. 4 is a fragmentary detail view of the structure shown in Fig. 3 looking in the direction of the arrows 4—4;

Fig. 5 is a fragmentary detail view of the apparatus shown in Fig. 3 looking in the direction of the arrows 5—5; and Fig. 6 is a fragmentary sectional view taken along the line 6—6 of Fig. 3 in the direction of the arrows.

Referring to the drawings, wherein like reference characters designate the same parts throughout the several views, particular reference being had at this time to Fig. 1, wherein there is shown a cross bar switch unit, designated generally by the numeral 10, and a fragment of a second similar unit, designated 11, in the same relative position they may occupy on a supporting frame (not shown). Since the units 10 and 11 may be of identical construction, only unit 10 has been fully shown. The unit 10 comprises a frame including upper and lower U-shaped horizontal frame members 12 and 13 and vertical side frame members 14 and 15 of substantially L-shaped configuration, together with the switching apparatus mounted on the frame.

The flanges of the U-shaped members 12 and 13 extend inwardly toward the center of the switch structure and have fixed to them, adjacent their ends, mounting plates or bearing plates 16 and 17 of irregular configuration which support horizontal bars 18 and their cooperating parts. The U-shaped members 12 and 13 also support a group of vertical assembly units 19 of substantially the same construction as the vertical unit assemblies shown in Patent No. 2,021,329 to Reynolds of November 15, 1935. The vertical assembly units 19 cooperate with the horizontal bars 18 and their associated equipment, all as clearly described in Reynolds Patent No. 2,021,329, the only difference between the equipment shown in said patent and that shown herein residing in the shape of the armatures for the vertical assembly units and similar minor details. Since all of the moving parts of the switch shown herein are similar to those shown in Patent No. 2,021,329, and the invention of the present application lies in the construction of the frame of the switch unit, further description of the vertical assembly units, horizontal bars and the apparatus cooperating therewith is not deemed necessary herein.

The front flanges 25 and 26 of the horizontal frame members 12 and 13 have a plurality of threaded apertures 27—27 therein to receive the mounting screws 28—28 of the vertical units 19 and the rear flanges 35 and 36 are slotted as shown at 29—29 to receive a projecting portion 30 of said vertical unit frame for positioning the units on the horizontal frame members 12 and 13. The front flanges 25 and 26 are also slotted to receive the ends of the mounting plates 16 and 17, which are welded to the flanges as shown at 31—31. The rear flanges 35 and 36 are bent adjacent their ends, as shown at 32—32 (Fig. 2), and do not extend to the ends of the webs 33 and 34 of the members 12 and 13, but only to the angle of the L-shaped side frame members 14 and 15.

Adjacent their ends, the bases 37 and 38 of the side frame members 14 and 15 are bent forward along the lines 39—39, as viewed in Fig. 1, and welding material is applied to the junction between the bases 37 and 38 and the webs 33 and 34 and between the bases 37 and 38 and the flanges 35 and 36 to form a substantially L-shaped weld, as shown in Fig. 4 at 45. The webs 46 and 47 of the side frame members 14 and 15 have projections 48—48 formed on each end thereof, which extend into slots 49 formed in cup-shaped depressions 50 formed in the webs 33 and 34 of the members 12 and 13 and extending inwardly toward the center of the cross bar unit. The projections 48 are so formed that they do not extend to the upper and lower faces of the webs 33 and 34, respectively, but simply provide an extending portion of the webs 46 and 47 of the side frame members 14 and 15, which may be fused with a drop of welding metal 51, which is also fused to the base of the cup-shaped depressions 50 in such a manner that neither the projection 48 nor the welding material will extend beyond the outer surface of the webs 33 and 34.

A pair of cup-shaped depressions 55 and 56, similar to the cup-shaped depressions 50, are formed in the web 33 to receive projecting portions 57—57 formed in the mounting or bearing plates 16 and 17 whereby drops of welding metal 58—58 may be deposited in the cup-shaped depressions to secure the mounting plates 16 and 17 to the horizontal frame member 12. The mounting plates 16 and 17 have bent-over portions 60—60 and 61—61 for supporting the electromagnets which actuate the horizontal bars 18 and have at their opposite ends bearing portions 62—62 and 63—63, respectively, for rotatably supporting the horizontal bars 18. The forward end (the lower end as viewed in Fig. 2) of the mounting plates 16 and 17 extend into slots 64 and 65 formed in the flanges 25 and 35 and are welded to the flanges by fusing welding material thereto at 31—31, as pointed out hereinbefore. In a similar manner, the mounting plates 16 and 17 have extending to the rear, as viewed in Fig. 1 and upwardly as viewed in Fig. 2, projections 68 and 69, which are welded as shown at 70 and 71 to the rear flanges 35 and 36 of the horizontal frame members 12 and 13, respectively.

Some slight modifications of the hereinbefore described apparatus may be made without departing from the invention, which is to be limited only by the scope of the appended claims.

What is claimed is:

1. A cross bar switch frame for supporting telephone switching apparatus comprising spaced horizontally extending channel-like members having their flanges extending vertically and their webs disposed in a horizontal plane, said channel-like members having cup-shaped depressions extending into the channel a predetermined distance and the base of said cup-shaped depressions being slotted, side frame members having projecting portions extending through said slots, and joining members of fusible metal fused to the projections and the depressions within the depressions.

2. A cross bar switch frame for supporting telephone switching apparatus comprising spaced horizontally extending channel-like members having their flanges extending vertically and their webs disposed in a horizontal plane, said channel-like members having cup-shaped depressions extending into the channel a predetermined distance and the base of said cup-shaped depressions being slotted, side frame members having projecting portions extending through said slot, joining members of fusible metal fused to the projections and the depressions within the depressions, and a pair of mounting plates for supporting parts of the switching apparatus provided with extending portions extending through slots in other of the cup-shaped depressions and secured to the cup-shaped depressions by welding metal fused to the cup-shaped portion of the channel-like members and the projections and being wholly contained in the cup-shaped depression.

3. A cross bar switch frame for supporting cross bar switching apparatus comprising spaced horizontal frame members channel-shaped in configuration with the flanges thereof extending inwardly, the webs of said horizontal frame members having slotted cup-shaped depressions formed therein and extending inwardly, side frame members of L-shaped configuration disposed at and secured to the ends of said horizontal frame members, mounting plates positioned intermediate the ends of said horizontal frame members, and means for securing the mounting plates and the side frame members to the horizontal members comprising extensions formed on the mounting plates and side frame members extending through slots in cup-shaped depressions formed in the horizontal frame members, and a fusible metallic part fused to the projections on the side frame members and mounting plates within the cup-shaped depressions in the horizontal frame members.

4. A cross bar switch frame for supporting cross bar switching telephone apparatus comprising mounting plates for supporting part of the switching apparatus, U-shaped horizontal frame members for supporting other of the switching apparatus in cooperative relation with the previously mentioned switching apparatus, inwardly extending cup-shaped portions formed on the horizontal frame members, projections formed on said mounting plates for extending through slots formed in the cup-shaped depressions, and auxiliary side frame members having extending portions extending through slots in other cup-shaped depressions in the horizontal frame members, said projecting portions and the horizontal frame members being secured one to another by fusible metal fused to the projecting portions and the base of the cup-shaped depression, said fusible metal being wholly contained within the depressions.

5. A cross bar switch frame for supporting cross bar switching telephone apparatus comprising mounting plates for supporting part of the switching apparatus, U-shaped horizontal frame members for supporting other of the switching apparatus in cooperative relation with the previously mentioned switching apparatus, inwardly extending cup-shaped portions formed on the horizontal frame members, projections formed on said mounting plates for extending through slots formed in the cup-shaped depressions, and auxiliary side frame members having extending portions extending through slots in other cup-shaped depressions in the horizontal frame members, said projecting portions and the horizontal frame members being secured one to another by fusible metal fused to the projecting portions and the base of the cup-shaped depression, said fusible metal being wholly contained within the depressions, the end portions of the horizontal frame members and the side frame members being offset inwardly and interconnected one to another by fusible metal fused thereto at their junction.

6. A cross bar switch frame for supporting telephone cross bar switching apparatus comprising spaced horizontal frame members substantially U-shaped in configuration having their flanges extending inwardly and having cup-shaped inwardly extending depressions with slotted bases formed in the webs thereof, side frame members having an L-shaped cross section and having extensions on their webs extending through the slots in the depressions into the cup-shaped depression, mounting plates of irregular configuration having projecting portions extending into other cup-shaped projections in the web of the horizontal frame members, and welding metal fused to said projections and projecting portions below the outer surface of the webs of the horizontal frame members.

7. A cross bar switch frame for supporting telephone cross bar switching apparatus comprising spaced horizontal frame members substantially U-shaped in configuration having their flanges extending inwardly and having cup-shaped inwardly extending depressions with slotted bases formed in the webs thereof, side frame members having an L-shaped cross section and having extensions on their webs extending through the slots in the depressions into the cup-shaped depression, mounting plates of irregular configuration having projecting portions extending into other cup-shaped projections in the web of the horizontal frame members, and welding metal fused to said projections and projecting portions below the outer surface of the webs of the horizontal frame members, said side frame members and horizontal frame members having their webs and flanges respectively bent inwardly away from the outer peripheral surface of the frame and being joined by a fusible element fused to them.

LOUIS H. CHRISTENSEN.